United States Patent
Ghosh et al.

(10) Patent No.: US 6,880,154 B2
(45) Date of Patent: Apr. 12, 2005

(54) ALIAS-FREE TEST FOR DYNAMIC ARRAY STRUCTURES

(75) Inventors: Somnath Ghosh, San Jose, CA (US); Rakesh Krishnaiyer, Santa Clara, CA (US); Wei Li, Redwood Shores, CA (US); Abhay Kanhere, Sunnyvale, CA (US); Dattatraya Kulkarni, Santa Clara, CA (US); Chu-cheow Lim, Santa Clara, CA (US); John L. Ng, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 600 days.

(21) Appl. No.: 09/896,936

(22) Filed: Jun. 29, 2001

(65) Prior Publication Data

US 2003/0005420 A1 Jan. 2, 2003

(51) Int. Cl.$^7$ ................................................. G06F 9/45
(52) U.S. Cl. ..................... 717/151; 717/145; 717/154; 717/155; 717/140; 711/105; 711/169; 711/170; 711/173
(58) Field of Search ............................... 717/136, 151, 717/145, 154, 155, 140, 169, 144; 711/154, 169, 170, 173; 709/226; 714/38

(56) References Cited

U.S. PATENT DOCUMENTS

| | | | | |
|---|---|---|---|---|
| 5,103,393 A | * | 4/1992 | Harris et al. ................. | 709/226 |
| 5,161,216 A | * | 11/1992 | Reps et al. .................. | 717/151 |
| 5,590,329 A | * | 12/1996 | Goodnow et al. .......... | 717/144 |
| 5,768,596 A | | 6/1998 | Chow et al. ................ | 395/709 |
| 5,819,088 A | | 10/1998 | Reinders ..................... | 395/672 |
| 5,842,019 A | * | 11/1998 | Kolawa et al. ............. | 717/130 |
| 5,872,990 A | * | 2/1999 | Luick et al. ................. | 712/24 |
| 5,974,470 A | * | 10/1999 | Hammond ................... | 719/331 |

(Continued)

OTHER PUBLICATIONS

TITLE: Dynamic Memory Allocation in Computer Simulation, author: Nielson et al, ACM, Nov. 1997.*
TITLE: Optimizing Dynamically–Dispatched Calls with Run–Time Type Feedback, author: Holzle, ACM, 1994.*
TITLE: An Integrated Memory Management Scheme for Dynamic Alias Resolution, author: Tzi–cker Chiueh, ACM, 1991.*
TITLE: Simulation of Marked Graphs on SIMD Architectures Using Efficient Memory Management, author: Sellami et al, IEEE, 1994.*
TITLE: Alias Analysis of Executable Code, author: Debray et al, ACM, 1998.*
TITLE: Memory Management for Prolog with Tabling, author: Demoen, ACM, 1988.*
TITLE: Resolution of Dynamic Memory Allocation and Pointers for the Behavioral synthesis from C, author: Semeria et al, ACM, 2000.*
TITLE: Fast Interprocedural Alias Analysis, author: Cooper et al, ACM, 1989.*
TITLE: An Integrated Memory Management Scheme For Dynamic Alias Resolution, author: Chiueh, ACM, 1991.*

*Primary Examiner*—Chameli C. Das
(74) *Attorney, Agent, or Firm*—Joni Stutman-Horn

(57) ABSTRACT

An apparatus, method, and program product for optimizing code that contains dynamically-allocated memory. The aliasing behavior of internal pointers of dynamically-allocated memory is used to disambiguate memory accesses and to eliminate false data dependencies. It is determined whether a dynamically-allocated array will behave like a statically-allocated array throughout the entire program execution once it has been allocated. This determination is used to improve the instruction scheduling efficiency, which yields better performance.

27 Claims, 6 Drawing Sheets

U.S. PATENT DOCUMENTS

| | | | | |
|---|---|---|---|---|
| 6,047,369 | A | | 4/2000 | Colwell et al. ............. 712/217 |
| 6,128,627 | A | * | 10/2000 | Mattis et al. ............... 707/202 |
| 6,138,231 | A | | 10/2000 | Deosaran et al. ........... 712/216 |
| 6,209,003 | B1 | * | 3/2001 | Mattis et al. ............... 707/206 |
| 6,209,020 | B1 | * | 3/2001 | Angle et al. ................ 718/108 |
| 6,237,079 | B1 | * | 5/2001 | Stoney ........................ 712/34 |
| 6,272,516 | B1 | * | 8/2001 | Angle et al. ................ 718/102 |
| 6,292,880 | B1 | * | 9/2001 | Mattis et al. ............... 711/216 |
| 6,311,327 | B1 | * | 10/2001 | O'Brien et al. ............. 717/114 |
| 6,401,181 | B1 | * | 6/2002 | Franaszek et al. .......... 711/170 |
| 6,427,234 | B1 | * | 7/2002 | Chambers et al. .......... 717/140 |
| 6,434,577 | B1 | * | 8/2002 | Garthwaite ................. 707/206 |
| 6,453,319 | B1 | * | 9/2002 | Mattis et al. ............... 707/100 |
| 6,463,582 | B1 | * | 10/2002 | Lethin et al. ............... 717/158 |
| 6,467,075 | B1 | * | 10/2002 | Sato et al. .................... 716/18 |
| 6,594,749 | B1 | * | 7/2003 | Czajkowski ................ 711/170 |
| 6,647,547 | B1 | * | 11/2003 | Kanamaru et al. .......... 717/151 |
| 6,658,559 | B1 | * | 12/2003 | Arora et al. ................ 712/245 |
| 6,665,787 | B2 | * | 12/2003 | Franaszek et al. .......... 711/206 |
| 6,665,865 | B1 | * | 12/2003 | Ruf ............................ 717/157 |
| 6,678,807 | B2 | * | 1/2004 | Boatright et al. ........... 711/154 |
| 6,684,393 | B1 | * | 1/2004 | Loen et al. ................. 717/151 |
| 6,701,420 | B1 | * | 3/2004 | Hamilton et al. ........... 711/170 |
| 6,718,485 | B1 | * | 4/2004 | Reiser ........................ 714/38 |
| 6,718,542 | B1 | * | 4/2004 | Kosche et al. .............. 717/151 |
| 6,721,943 | B2 | * | 4/2004 | Krishnaiyer et al. ........ 717/150 |
| 6,804,763 | B1 | * | 10/2004 | Stockdale et al. .......... 711/170 |

\* cited by examiner

```
                                          140-1
A = (double ***) malloc(N * sizeof(double **)); ~205
for (i=0; i<N;i++)
A[i] = (double **) malloc(3 * sizeof(double *)); ~210
        for (j=0; j<3; j++)
                A[i][j] = (double *) malloc(M * sizeof(double)); ~215
```

FIG. 2A

```
                                          140-2
    for (i=0; i<M; i++) {
250    ~A[1][1][i] = 2*i;
       255  A[1][3][i] = A[1][2][i] * 2;
       265~A[1][1] = p;        ~260
       }
```

FIG. 2B

ALIAS-FREE TEST FOR DYNAMIC ARRAY STRUCTURES

FIELD

This invention relates generally to computers and more particularly to compilers that support dynamic memory allocation.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © Intel, Incorporated, 2000. All Rights Reserved.

BACKGROUND

A computer operates under the control of programs consisting of coded instructions called object code that execute on the computer. But, object code is not readily understood by humans, so a human programmer typically writes programs in a high-level programming language, such as BASIC, PASCAL, C, C++, or the like, which is easier to understand. High-level languages generally have a precise syntax that defines certain permitted structures for statements in the language and their meaning. A compiler, which is itself a program, translates the high-level language statements, called "source code" into object code. Thus, the terms "source code" and "object code" describe the form of a program prior to and after translation, respectively. Accordingly, the term "source code" generally refers to a program in its high-level programming language form. "Object code," on the other hand, generally refers to the program in the form of the coded instructions generated by the compiler that are executable on a computer.

In modern microprocessors, compilers play a significant role in obtaining good performance of the object code. In particular, the compiler's ability to extract instruction-level parallelism (ILP) in a program quite often holds the key to improved performance. For memory references, ILP can effectively hide the latency of performance-critical load operations by executing the loads before earlier store operations.

Without accurate data-dependence information, the efficiency of ILP to reorder memory operations suffers significantly. This accuracy of data-dependence information critically depends on the compiler's ability to distinguish memory accesses to different locations, a process called memory disambiguation. When two memory accesses cannot be disambiguated, they may be "aliased", i.e., they may refer to the same memory location.

In many programming languages, programs can be written to dynamically allocate and create multi-dimensional arrays. Here "dynamic allocation" refers to obtaining storage at runtime as opposed to determining storage at compile time. In C programs, for example, multi-dimensional arrays are allocated and formed dynamically through the function-call "malloc" defined in the C language. The program then performs various computations on these arrays and finally deallocates them using another C language defined function-call "free". In such programs, the compiler must disambiguate between references to dynamically-allocated multi-dimensional arrays in order to improve instruction-level parallelism. But, current techniques are inadequate to disambiguate between references to a dynamically-allocated multi-dimensional array. Therefore, performance of such programs can be severely affected when key loops cannot be parallelized due to false data dependencies that cannot be eliminated since the compiler was unable to disambiguate the dynamic-array accesses.

What is needed is a mechanism to disambiguate real data dependencies from false data dependencies, so that more loops can take advantage of instruction-level parallelism and performance of the resulting object code can be increased.

BRIEF DESCRIPTION OF THE DRAWINGS

FIGS. 2A and 2B depict block diagrams of example source code to be compiled, according to an embodiment of the invention.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. But, it is understood that the invention may be practiced without these specific details. In other instances, well-known circuits, structures and techniques have not been shown in detail in order not to obscure the invention.

Figure 1:
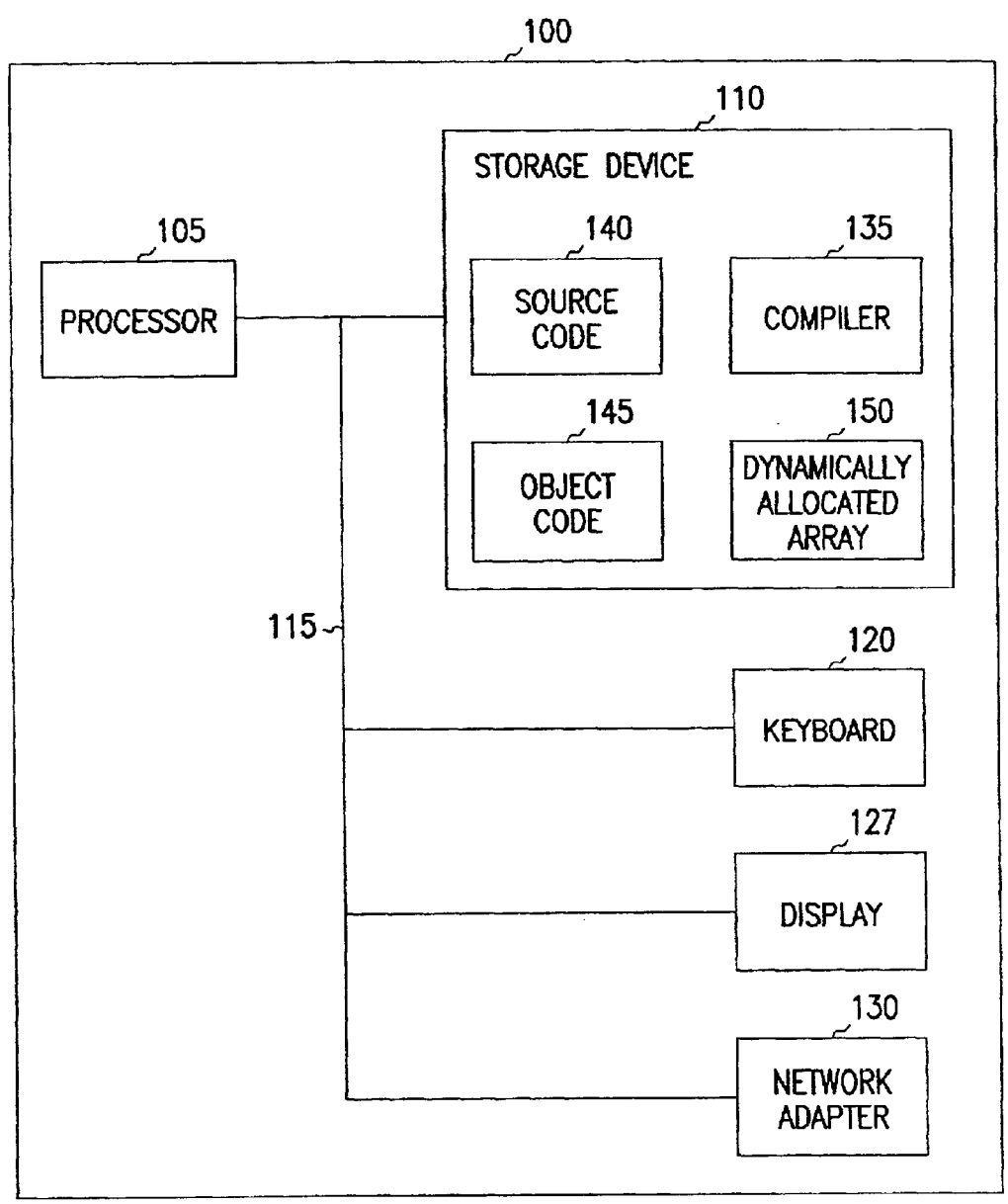
FIG. 1 depicts a block diagram of a computer that can be used to implement an embodiment of the invention.

FIG. 1 shows a block diagram illustrating an exemplary computer system 100 according to an embodiment of the invention. The exemplary computer system 100 includes processor 105, storage device 110, keyboard 120, display device 127, and network adapter 130, all communicatively coupled via bus 115. An unillustrated network may also be coupled to bus 115 through network adapter 130.

Processor 105 represents a central processing unit of any type of architecture, such as a CISC, RISC, VLIW, or a hybrid architecture, although any appropriate processor can be used. Processor 105 executes instructions and includes that portion of computer 100 that controls the operation of the entire computer, including executing the arithmetical and logical functions contained in a particular computer program. Although not depicted in FIG. 1, processor 105 typically includes a control unit that organizes data and program storage in computer memory and transfers data and other information between the various part of the computer system. Processor 105 receives input data from input devices such as keyboard 120 and network adapter 130, reads and stores code and data in storage device 110, and presents output data to a user via display device 127. Processor 105 also sends and receives packets of information across a network using network adapter 130. Although computer 100 is shown to contain only a single processor and a single system bus, the present invention applies equally to computers that have multiple processors and to computers that have multiple buses that each performs different functions in different ways.

Storage device 110 represents one or more mechanisms for storing data. For example, storage device 110 can include read only memory (ROM), random access memory (RAM), magnetic disk storage mediums, optical storage mediums, flash memory devices, and/or other machine-readable mediums. Although only one storage device 110 is shown, multiple storage devices and multiple types of storage devices can be present. Further, although computer 100 is drawn to contain storage device 110, the storage device can be distributed across other computers.

Bus 115 represents one or more busses (e.g., PCI, ISA, X-Bus, EISA, VESA, or any other appropriate bus) and bridges (also termed bus controllers).

FIG. 1 also illustrates that storage device 110 has stored therein compiler 135, source code 140, object code 145, and dynamically-allocated array 150. Of course, storage device 110 can also contain additional software (not shown), which is not necessary to understanding the invention. Compiler 135 contains instructions capable of being executed on processor 105. In another embodiment, compiler 135 can be implemented in hardware in lieu of a processor-based system. Compiler 135 compiles source code 140 into object code 145 that creates dynamically-allocated array 150. An example of source code 140 is described below with reference to FIGS. 2A and 2B. An example of dynamically-allocated array 150 is described below with reference to FIG. 3. The operations of compiler 135 are further described below with reference to FIGS. 4, 5, and 6.

Keyboard 120 is that part of computer 100 that resembles a typewriter keyboard and that enables a user to control particular aspects of the computer.

Display device 127 is the visual output of computer 100. Display device 127 can be a cathode-ray tube (CRT) based video display well known in the art of computer hardware. But, with a portable or notebook-based computer, display device 127 can be replaced with a liquid crystal display (LCD) based or gas, plasma-based, flat-panel display. In still other embodiments, any appropriate display device can be used.

Network adapter 130 facilitates communication between computer 100 and an unillustrated network. Network adapter 130 provides a user of computer 100 with a means of electronically communicating information, such as packets, with a remote computer or a network logical-storage device. In addition, in another embodiment, network adapter 130 supports distributed processing, which enables computer 100 to share a task with other computer systems linked to the network. Although network adapter 130 is shown as part of computer 100, in another embodiment they are packaged separately.

Computer 100 can be implemented using any suitable computer, such as a personal computer available from a number of vendors. Portable computers, laptop computers, mainframe computers, handheld devices, and network computers or Internet appliances are examples of other possible configurations. The hardware and software depicted in FIG. 1 may vary for specific applications. For example, other peripheral devices such as pointing devices, speech recognition devices, audio adapters, or chip programming devices, such as PAL or EPROM programming devices may be used in addition to or in place of the hardware already depicted. Thus, an embodiment of the invention can apply to any hardware configuration that allows compiling code, regardless of whether the hardware configuration is a complicated, multi-user computing apparatus, a single-user workstation, or a network appliance that does not have non-volatile storage of its own.

As will be described in detail below, aspects of an embodiment pertain to specific apparatus and method elements implementable on computers. In another embodiment, the invention can be implemented as a computer program product for use with a computer system. The programs defining the functions of this embodiment can be delivered to a computer via a variety of signal-bearing media, which include, but are not limited to:

(1) information permanently stored on non-rewriteable storage media (e.g., read only memory devices within a computer such as CD-ROM readable by a CD-ROM drive;

(2) alterable information stored on rewriteable storage media (e.g., a hard disk drive or diskette); or (3) information conveyed to a computer by a communications media, such as through a computer or telephone network accessed via network adapter 130, including wireless communications.

Such signal-bearing media, when carrying computer-readable instructions that direct the functions of the present invention, represent embodiments of the present invention.

FIGS. 2A and 2B depict block diagrams of example source code 140-1 and 140-2 to be compiled, according to an embodiment of the invention. Source code 140-1 and 140-2 are examples of source code 140, as previously described above with reference to FIG. 1. Referring again to FIG. 2A, statements 205, 210, and 215 direct compiler 135 to generate object code that dynamically allocates an array "A" in three dimensions. The layout of array A in memory is further described below with reference to FIG. 3. Referring again to FIG. 2A, "malloc" is the memory-allocation function call defined in the C language, although in other embodiments, any language and any memory-allocation function call can be used.

FIG. 2B shows an example use of the elements of dynamically-allocated array A in For Loop 250. The store of A[1][1][i] at reference label 255, and the load of A[1][2][i] at reference label 260 can only be overlapped or reordered for better instruction scheduling if compiler 135 knows for certain that the memory locations accessed by A[1][1][i] 255 and A[1][2][i] 260 are distinct and do not map to the same memory location. Prior compilers cannot disambiguate the two accesses 255 and 260 because A[1][1][i] 255 and A[1][2][i] 260 are defined by the same malloc site 215 (a "malloc site" is defined to be a particular instance of the function-call malloc in the source code), but compiler 135 can disambiguate the two accesses 255 and 260 using the operations described below with reference to FIGS. 4, 5, and 6.

Compiler 135 uses an alias-free test to determine whether the internal pointers used to reference elements of array A are defined once in each call to malloc and then never aliased in the program. (See FIG. 3, described below, for examples of internal pointers.) If the alias-free test succeeds for the internal pointers of array A, then compiler 135 can safely assume that A[1][1][i] 255 and A[1][2][i] 260 reference distinct memory locations and can effectively create object code to reorder their store and load respectively. Thus, the alias-free test of compiler 135 determines whether a dynamically allocated multidimensional array will behave as a static array after it is allocated at runtime. More specifically, compiler 135 checks whether the internal pointers used to form the dynamic array are defined only once during the array allocation and are never aliased.

FIG. 2b also shows another statement 265, which alters the intermediate pointers used to access array A. Statements that alter the internal pointers used to access dynamically-allocated arrays cannot be optimized and will cause the alias-free test of compiler 135 to return a failure indication.

Figure 3:
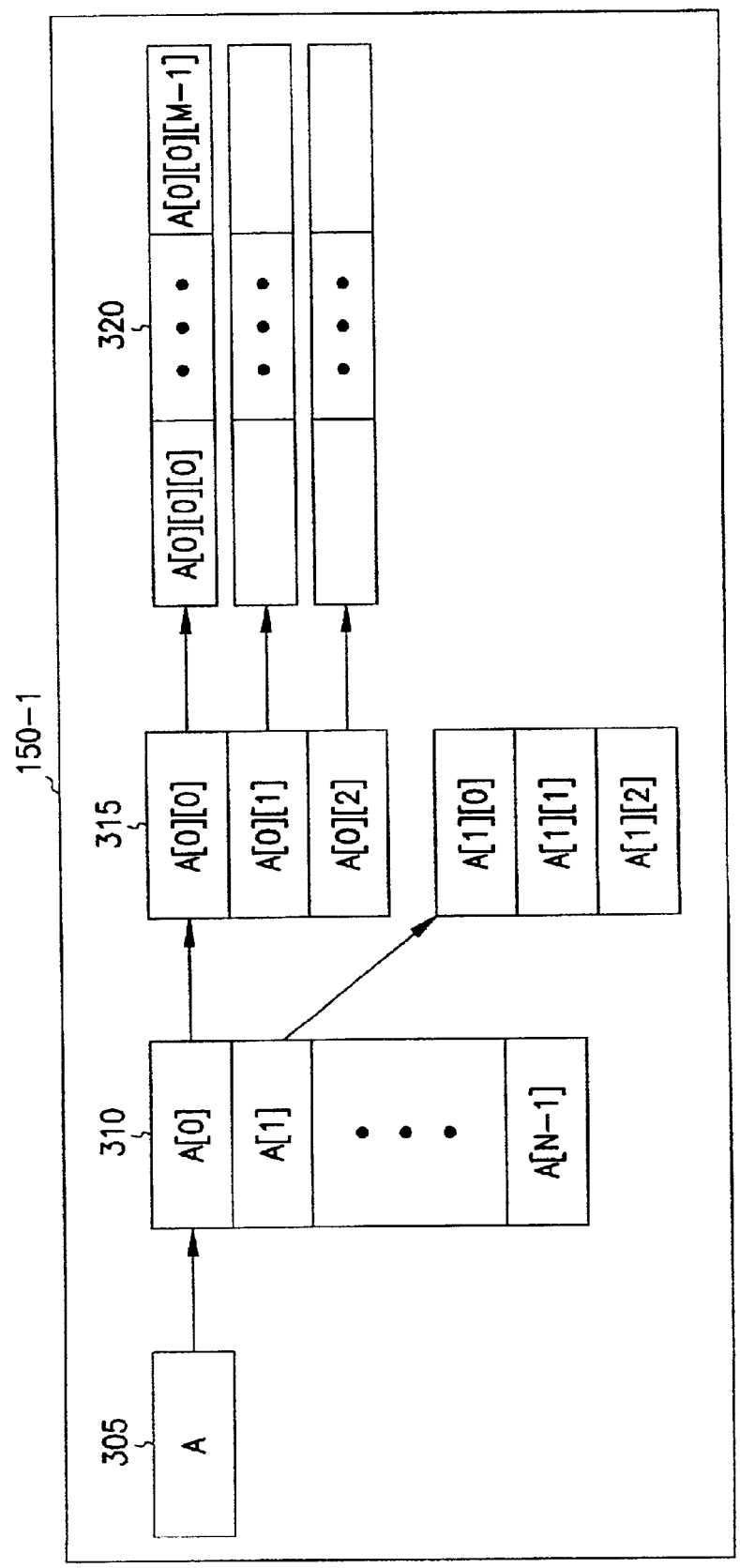
FIG. 3 depicts a block diagram of allocated memory, according to an embodiment of the invention.

FIG. 3 depicts a block diagram example of dynamically-allocated memory, according to an embodiment of the invention. Dynamic memory array 150-1 is an example of dynamic memory array 150, as previously described above with reference to FIG. 1. Dynamic memory array 150-1 corresponds to the memory allocated by the code illustrated in the example of FIG. 2A. Referring again to FIG. 3, dynamic memory array 150-1 contains base pointer 305, first level of internal pointers 310, second level of internal pointers 315, and array elements 320. First level of internal pointers 310 are stored in the memory location associated with statement 205. Second level of internal pointers 315 are stored in the memory location associated with statement 210. Array elements 320, which is where the actual array elements are stored, are stored in the memory location associated with statement 215. Each of the internal pointer levels corresponds to a respective dimension in the multi-dimensional array A.

Dynamically-allocated array A in this example has a first dimension of "N" elements (0 to N−1), a second dimension of 3 elements (0 to 2), and a third dimension of "M" elements (0 to M−1). The values of "N" and "M" are determined at runtime and can be any integers. The second dimension is defined to be 3 in this example, for ease of drawing the figure, but any number can be used for the second dimension. Also, the dimensions can be any combination of statically-allocated and dynamically-allocated dimensions, and in other embodiments all or only some of the dimensions of the array are dynamically allocated. Also, the invention is not limited to arrays of three dimensions, and the number of dimensions can be one, two, three, or any number.

Figure 4:
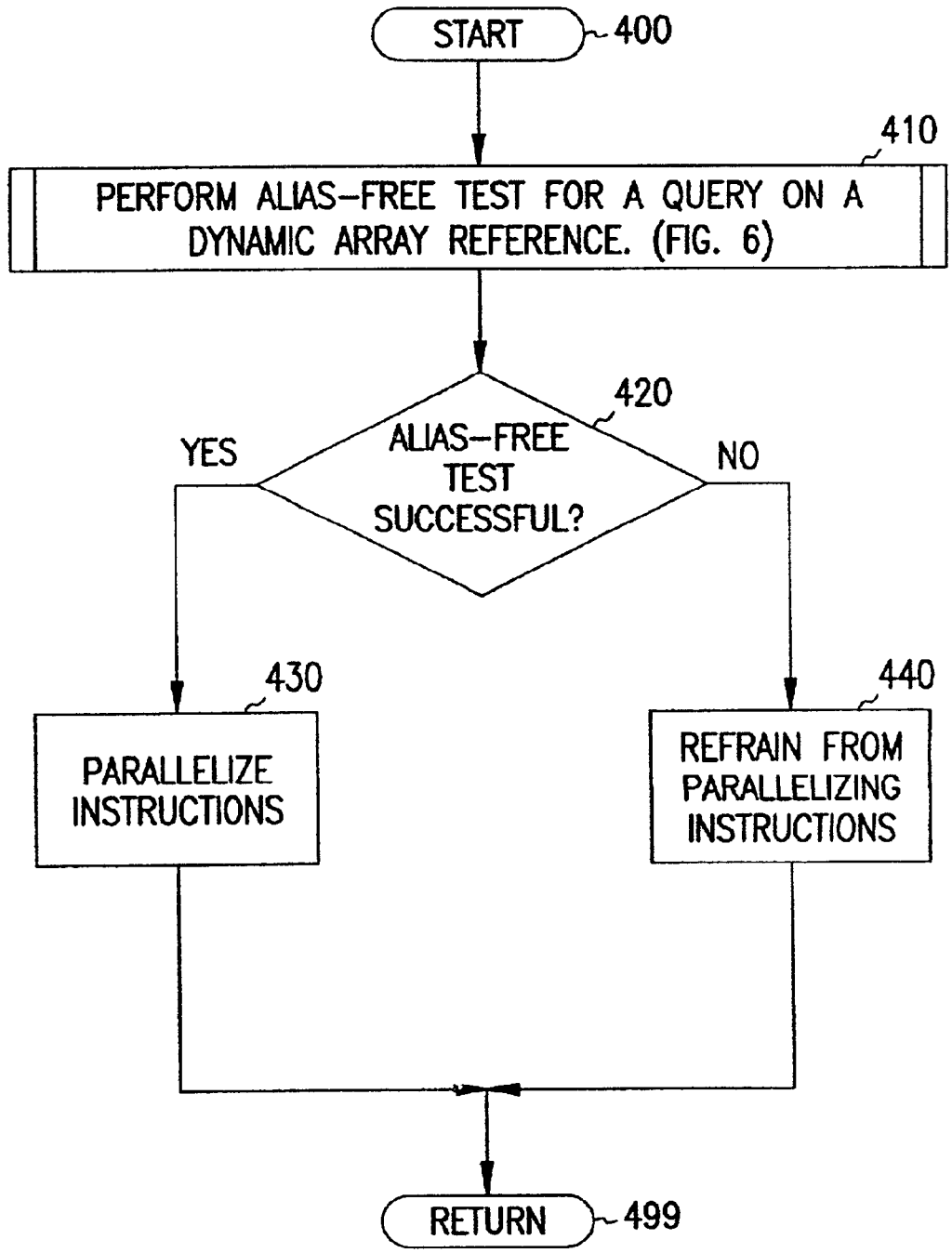
FIGS. 4, 5, and 6 depict flowcharts that describe a method according to an embodiment of the invention.
Figure 5:
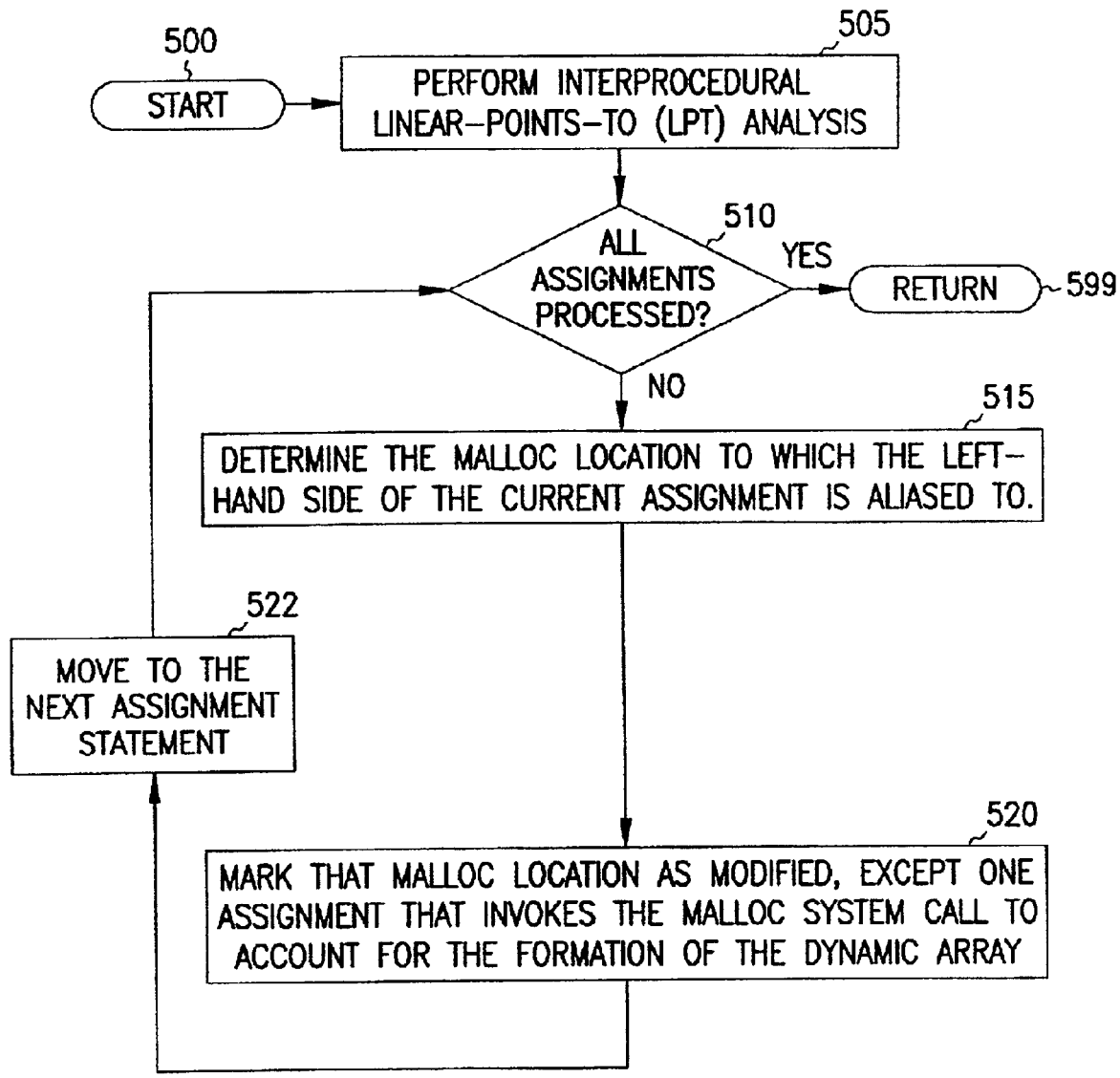
Figure 6:
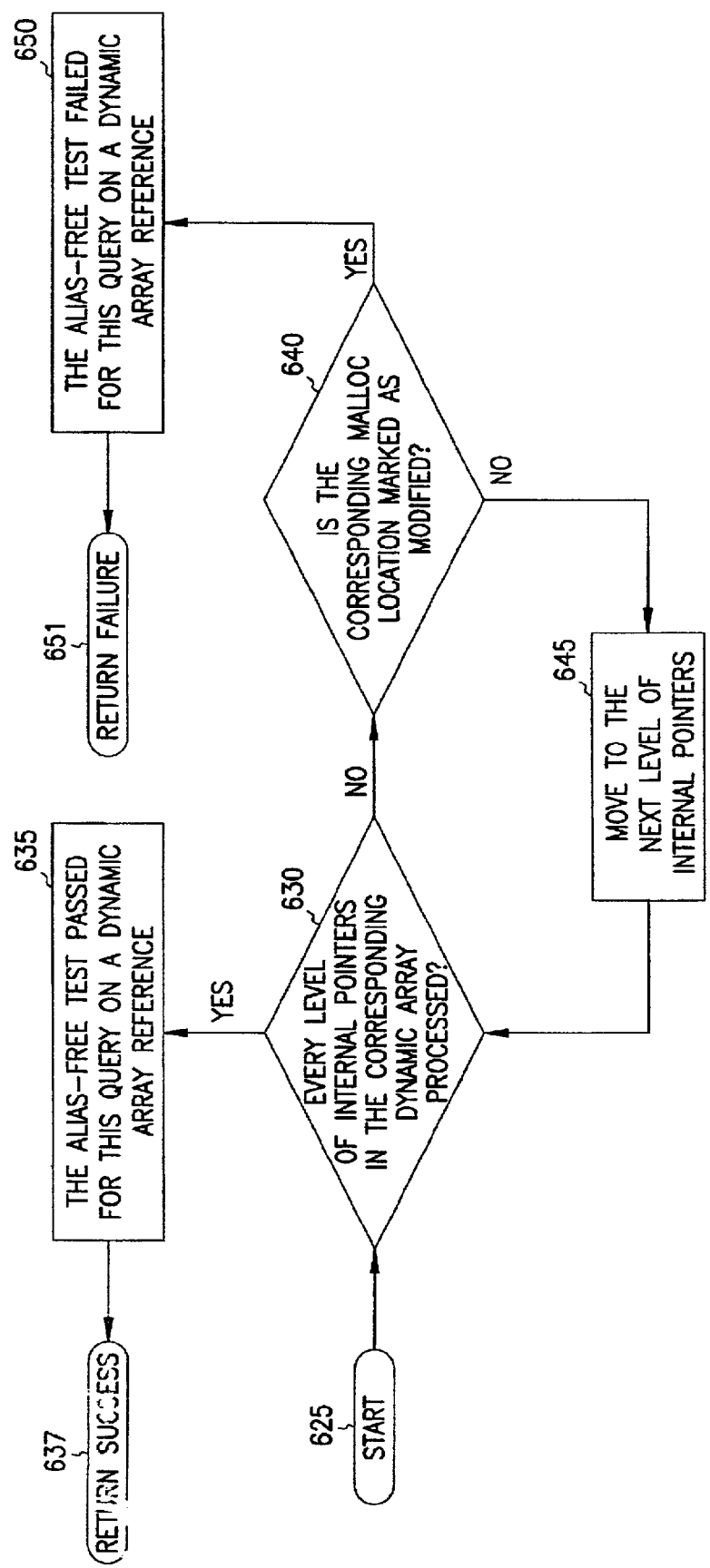

FIG. 4 depicts a flowchart that describes a method for parallelizing code at computer 100, according to an embodiment of the invention. Control begins at block 400. Control then continues to block 410 where compiler 135 performs the alias-free test for a query on a dynamic-array reference, as further described below with reference to FIG. 6. Although only one invocation of the functions of FIG. 6 are shown in block 410, many invocations can be performed. Referring again to FIG. 4, control then continues to block 420 where compiler 135 determines whether the alias-free test was successful for certain dynamic-array references. Although only one test is shown at block 420, many can be performed depending on the number and type of dynamic array-references. If the determination at block 420 is true, then control continues to block 430 where the instructions associated with the determination in block 420 are parallelized. In one embodiment, compiler 135 generates object code that overlaps load and store instructions. In another embodiment, compiler 135 generates object code that will execute a load instruction before an earlier store instruction. In still another embodiment software pipelining is performed. But, the invention can apply to any parallelizing technique that allows better instruction scheduling. FIG. 5 depicts a flowchart that describes a preprocessing method at computer 100, according to an embodiment of the invention. Control begins at block 500. Control then continues to block 505 where compiler 135 performs interprocedural linear-points-to analysis (LPT) on source code 140. LPT is interprocedural in that it performs optimization between procedures. LPT analysis looks at all procedures in source code 140 and determines the memory locations that are referenced by pointers in source code 140. LPT analysis also determines all of the pointers that reference each memory-allocation call. In addition, LPT analysis groups all the pointers into distinct sets in such a way that the pointers, across multiple sets, will not map to the same memory location.

Control then continues to block 510 where compiler 135 determines whether all assignments in source code 140 have been processed. Block 510 is the beginning of a loop represented by blocks 510, 515, 520, and 522, which will process all assignment statements within source code 140.

When the determination at block 510 is false, control then continues to block 515 where compiler 135 determines the malloc location to which the left-hand side of the current assignment is aliased. That is, compiler 135 determines which statement (e.g., 205, 210, or 215) in source code 140 created the malloc location associated with the assignee (the left-hand side of an assignment statement) in the current assignment statement. Using the examples of FIGS. 2A, 2B, and 3, one assignee is A[1][1][i] 255, and compiler 135 at block 515 determines, in this example, that the malloc location associated with assignee 255 is malloc statement 215, which corresponds to array elements 320.

Referring again to FIG. 5, control then continues to block 520 where compiler 135 marks the malloc location found in block 515 as modified. Except that any assignment that invokes the malloc system call to account for the formation of the dynamic array is not marked as modified, such as assignments 205, 210, and 215 in the example shown in FIG. 2A. Using the same example as for block 515, compiler 135 marks the malloc location associated with statement 215 as modified since it is the malloc location associated with assignee 255.

Referring again to FIG. 5, control then continues to block 522 where compiler 135 moves to the next assignment statement in source code 140. Control then returns to block 510, as previously described above.

When the determination at block 510 is true, then all assignments within source code 140 have been processed, so control then continues to block 599 where the preprocessing phase concludes and the function returns.

FIG. 6 depicts a flowchart that describes processing for a query on a dynamic-array reference at computer 100, according to an embodiment of the invention. The processing of FIG. 6 is invoked once for each "query" from any compiler module. Here a "query" refers to a question that asks if a particular dynamic-array reference is alias-free and so can be treated as a statically-allocated array. Control begins at block 625. Control then continues to block 630 where compiler 135 determines whether every level of internal pointers in the dynamic array corresponding to the current query have been processed.

If the determination at block 630 is false, then control continues to block 640 where compiler 135 determines whether the malloc location corresponding to the current level of internal pointers is marked as having been modified. If the determination at block 640 is false, then control continues to block 645 where compiler 135 moves to the next level of internal pointers. Control then returns to block 630, as previously described above.

If the determination at block 640 is true, then control then continues to block 650 where compiler 135 indicates that the alias-free test failed for this query on a dynamic-array reference, so this query must be treated as query on a dynamic array. An example of such an assignment that causes the alias-free test to fail is statement 265 in FIG. 2B, which modifies second level of internal pointers 315 in FIG. 3. Referring again to FIG. 6, control then continues to block 651 where the function returns.

Referring again to FIG. 6, if the determination at block 630 is true, then control continues to block 635 where compiler 135 indicates that the alias-free test passed for this query on a dynamic array reference, so this query can be treated as a query on a static array reference. Control then continues to block 637 where the function returns.

Conclusion

Code that dynamically allocates memory is optimized. An alias-free test analyzes the aliasing behavior of internal pointers of dynamically-allocated arrays and uses the analysis to disambiguate memory accesses and to eliminate false data dependencies. When a dynamically-allocated array behaves like a statically-allocated array throughout the entire program execution, the alias-free test allows better instruction scheduling, which yields better performance.

What is claimed is:

1. A method, comprising:

for every assignment statement in source code, determining a dynamic memory-allocation statement in the source code to which an assignee in the respective assignment statement refers;

when the respective assignment statement does nor allocate memory, marking the respective dynamic memory-allocation statement as modified; and when the assignment statement does allocate memory, refraining from marking the respective dynamic memory-allocation statement as modified.

2. The method of claim 1, further comprising:

for every query on a dynamic array reference in the source code and for each level of internal pointers in a dynamic array associated with the query, determining whether the respective dynamic memory-allocation statement is marked as modified.

3. The method of claim 2, further comprising:

when none of the respective dynamic memory-allocations statements are marked as modified for the respective query, indicating that the respective dynamic-array is alias-free.

4. The method of claim 1, further comprising:

performing interprocedural linear-points-to analysis on the source code.

5. The method of claim 1, further comprising:

generating object code to create a multi-dimensional array in response to the dynamic memory-allocation statement.

6. The method of claim 5, further comprising:

creating internal pointers in response to the dynamic memory-allocation statement, wherein the internal pointers comprise a plurality of pointer levels, wherein each of the plurality of pointer levels corresponds to a respective dimension in the multi-dimensional array.

7. The method of claim 5, wherein at least one dimension of the multi-dimensional array is dynamic.

8. A compiler to translate source code into object code, wherein the compiler comprises instructions to:

create internal pointers in response to a dynamic memory-allocation statement in the source code;

determine whether the internal pointers will be aliased when the object code is executed;

when the internal pointers are not aliased, parallelize memory accesses in the object code, wherein the memory accesses are associated with the dynamic memory-allocation statement;

when the dynamic memory-allocation statement in the source code does not allocate memory, mark the respective dynamic memory-allocation statement as modified; and when the dynamic memory-allocation statement in the source code allocates memory, refrain from marking the dynamic memory-allocation statement as modified.

9. The compiler of claim 8, wherein the compiler is to generate a portion of the object code to create a multi-dimensional array in response to the dynamic memory-allocation statement.

10. The compiler of claim 9, wherein the internal pointers comprise a plurality of pointer levels, wherein each of the plurality of pointer levels corresponds to a respective dimension in the multi-dimensional array.

11. The compiler of claim 9, wherein at least one dimension of the multi-dimensional array is dynamic.

12. The compiler of claim 8, wherein the instructions are further to:

perform interprocedural linear-points-to analysis on the source code.

13. A computer, comprising:

a processor; and memory communicatively coupled to the processor, wherein the memory comprises instructions, which when executed on the processor are to;

find a dynamic memory-allocation statement in source code, determine whether the source code includes a plurality of memory access statements to a memory allocated by the dynamic memory-allocation statement, wherein the plurality of memory access statements, when executed, with access the memory as if the memory were statically allocated, parallelize the plurality of memory access statements when the memory access statements will access the memory as if the memory were statically allocated;

when the dynamic memory-allocation statement in the source code does not allocate memory, mark the respective dynamic memory-allocation statement as modified; and when the dynamic memory-allocation statement in the source code allocates memory, refrain from marking the dynamic memory-allocation statement as modified.

14. The computer of claim 13, wherein the dynamic memory-allocation statement is to direct the instructions to:

create a multi-dimensional array.

15. The computer of claim 14, wherein at least one dimension of the multi-dimensional array is dynamic.

16. The computer of claim 14, wherein all dimensions of the multi-dimensional array are dynamic.

17. The computer of claim 14, wherein the instructions are further to create internal pointers in response to the dynamic memory-allocation statement, wherein the internal pointers comprise a plurality of pointer levels, wherein each of the plurality of pointer levels corresponds to a respective dimension in the multi-dimensional array.

18. The compiler of claim 13, wherein to parallelize the plurality of memory access statements further comprises reordering load and store operations.

19. A signal-bearing media comprising instructions, wherein the instructions when read and executed by a processor comprise:

determining whether source code includes a plurality of memory access statements to a memory allocated by a dynamic memory-allocation statement in the source code, wherein the plurality of memory access statements, when executed, will access the memory as if the memory were statically allocated;

when the determining element is true, parallelizing the plurality of memory access statements;

when the dynamic memory-allocation statement in the source code does not allocate memory, marking the respective dynamic memory-allocation statement as modified; and when the dynamic memory-allocation statement in the source code allocates memory, refraining from marking the respective memory-allocation statement as modified.

20. The signal-bearing media of claim 19, wherein the dynamic memory-allocation statement is to direct the instructions to:

create a multi-dimensional array.

21. The signal-bearing media of claim 20, wherein at least one dimension of the multi-dimensional array is dynamic.

22. The signal-bearing media of claim 21, wherein all dimensions of the multi-dimensional array are dynamic.

23. The signal-bearing media of claim 20, wherein the instructions are further to create internal pointers in response to the dynamic memory-allocation statement.

24. The signal-bearing media of claim 20, wherein the internal pointers comprise:

a plurality of pointer levels, wherein each of the plurality of pointer levels corresponds to a respective dimension in the multi-dimensional array.

25. The signal-bearing media of claim 19, wherein parallelizing the plurality of memory access statements further comprises:

pipelining the plurality of memory access statements.

26. The signal-bearing media of claim 19, wherein parallelizing the plurality of memory access statements further comprises:

overlapping a load instruction with a prior store instruction.

27. The signal-bearing media of claim 19, wherein parallelizing the plurality of memory access statements further comprises:

reordering a load instruction and a prior store instruction.

\* \* \* \* \*

UNITED STATES PATENT AND TRADEMARK OFFICE
CERTIFICATE OF CORRECTION

PATENT NO.    : 6,880,154 B2
DATED         : April 12, 2005
INVENTOR(S)   : Ghosh et al.

It is certified that error appears in the above-identified patent and that said Letters Patent is hereby corrected as shown below:

Column 7,
Line 32, delete "nor" and insert -- not --.

Column 8,
Line 42, delete "with" and insert -- will --.

Signed and Sealed this

Twenty-eighth Day of June, 2005

JON W. DUDAS
*Director of the United States Patent and Trademark Office*